E. DETTMAR.
REFRIGERATING APPARATUS.
APPLICATION FILED APR. 20, 1909.
1,000,723.
Patented Aug. 15, 1911.
3 SHEETS—SHEET 2.
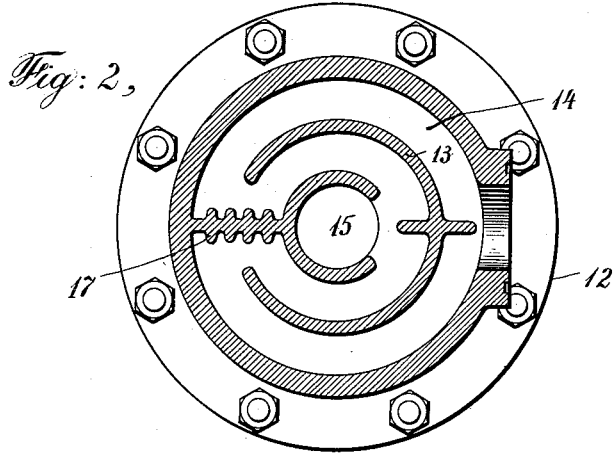
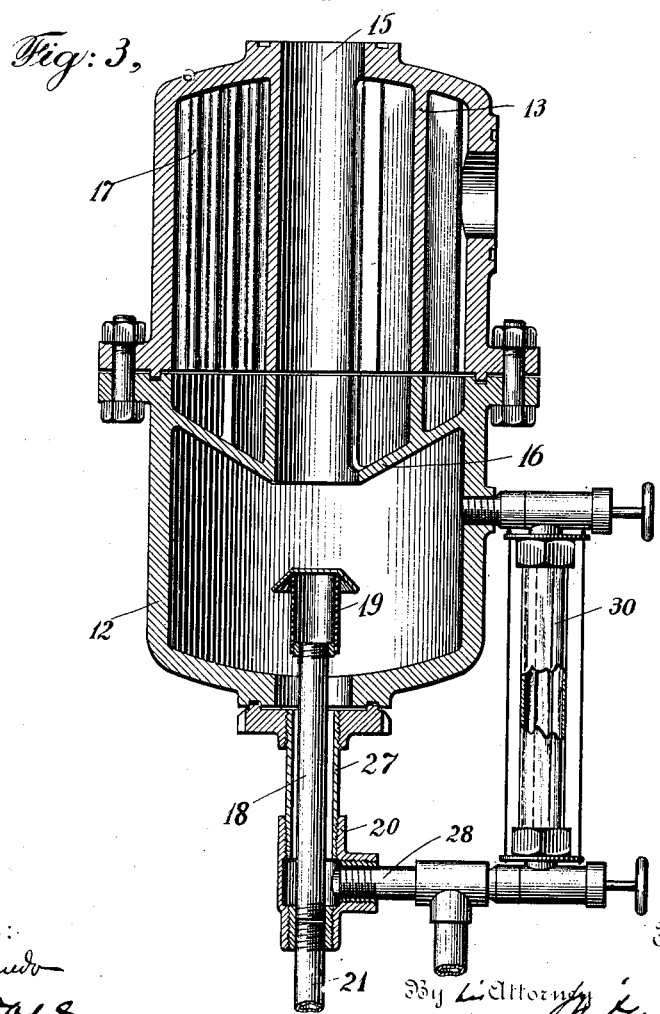

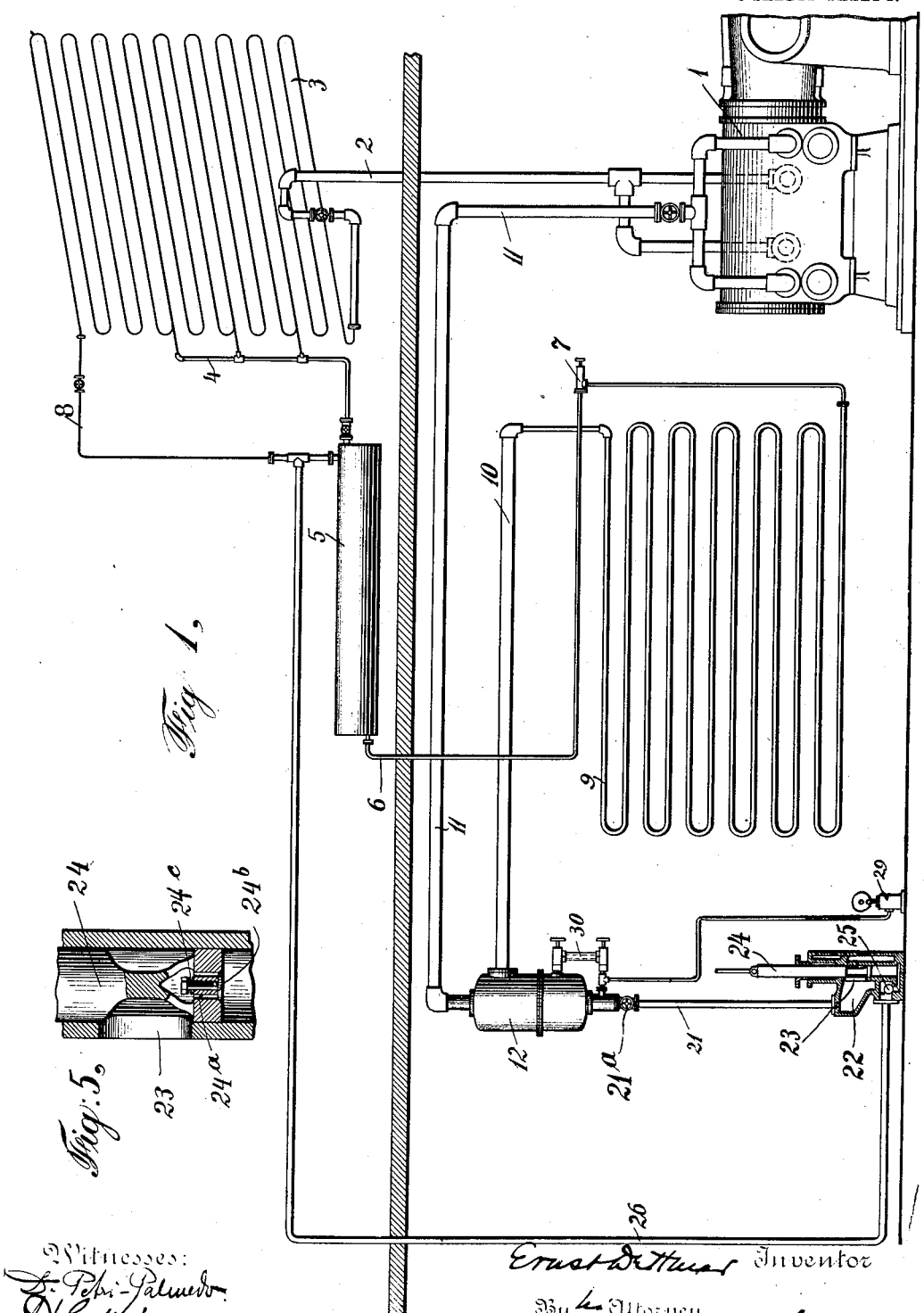

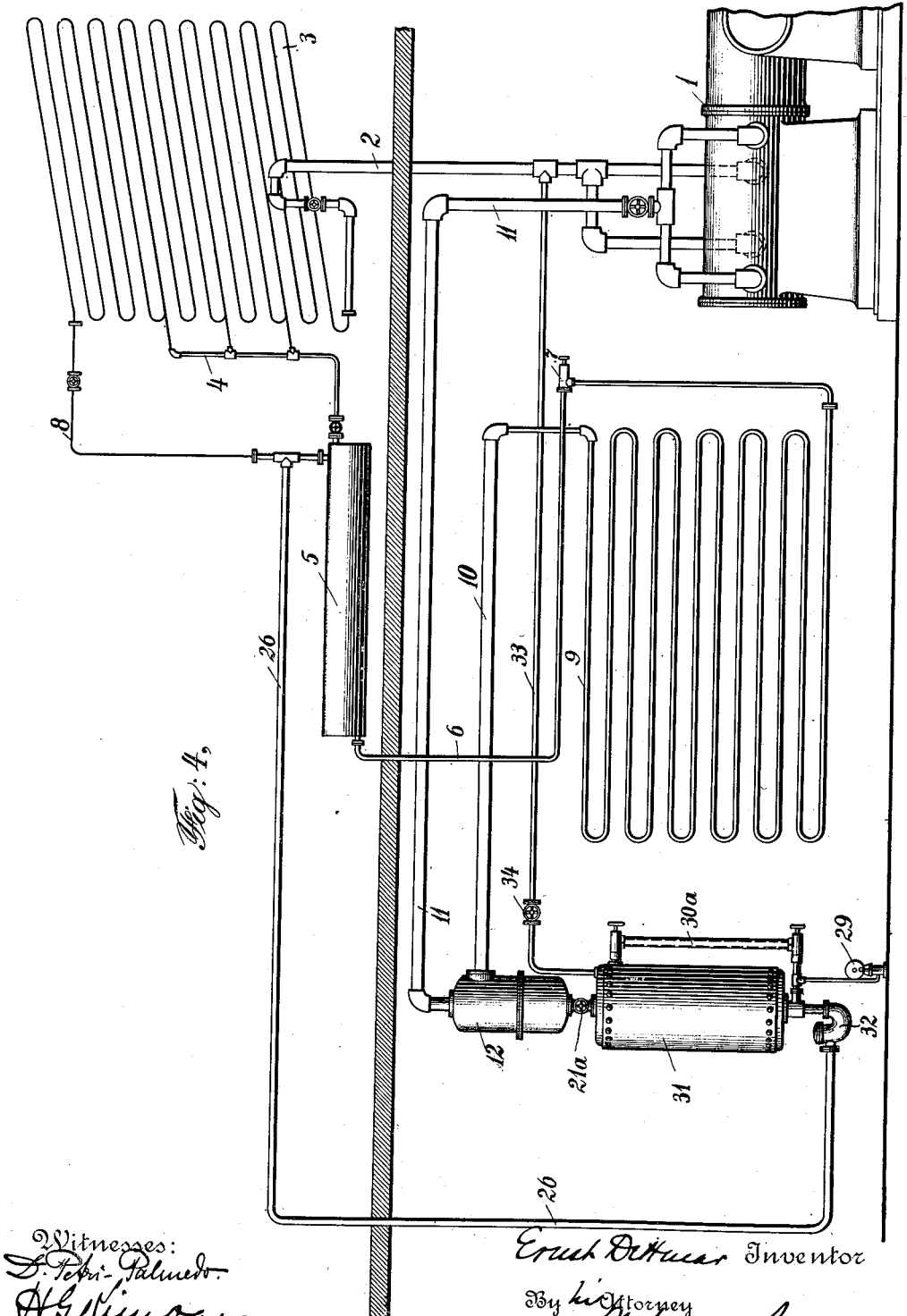

UNITED STATES PATENT OFFICE.

ERNST DETTMAR, OF NEW YORK, N. Y., ASSIGNOR TO DE LA VERGNE MACHINE COMPANY, OF NEW YORK, N. Y., A CORPORATION OF NEW YORK.

REFRIGERATING APPARATUS.

1,000,723. Specification of Letters Patent. Patented Aug. 15, 1911.

Application filed April 20, 1909. Serial No. 491,147.

*To all whom it may concern:*

Be it known that I, ERNST DETTMAR, a citizen of the United States of America, residing in the borough of Manhattan, city, county, and State of New York, have invented certain new and useful Improvements in Refrigerating Apparatus, of which the following is a full, true, and concise specification.

The invention seeks to improve the efficiency and the facility of operation and control of refrigerating systems of the expansion type, and involves the provision of means for promoting continuous, uniform gasification of the liquid refrigerant throughout the length of the expansion coil, and certain other provisions, hereinafter described and illustrated, and more particularly pointed out in the claims.

In the drawings, Figure 1 is a diagrammatic view illustrating a refrigerating system employing my invention; Figs. 2 and 3 are respectively transverse and longitudinal views of the separator shown in Fig. 1; Fig. 4 is a modified form of the new system; and Fig. 5 is a detail of a plunger valve.

The compressor 1, which is adapted for compressing ammonia gas or other suitable refrigerant in its gaseous form, discharges its compressed gas through the force-pipe 2 into the condenser coils 3, wherein the heat of compression is abstracted and the compressed gas becomes liquefied. The liquefied refrigerant passes from thence through the pipe 4 to the liquid storage tank 5, from which it passes through pipe 6 to the expansion valve 7. The pipe 8 leading from the top of the condenser coils to the storage tank 5 is the usual connection for equalizing the pressure in those parts. Passing through the expansion-valve 7, which is a valve with a restricted and adjustable valve-port opening, the refrigerant enters and expands into and through the expansion coil or coils 9, which are maintained, as presently explained, in a state of relative rarefaction, as compared to the previous pressure of the liquid, so that gasification of the same takes place promptly and with a coincident absorption of heat units from the brine or whatever heat-vehicle may surround the coils. The expansion coil 9, being the direct refrigerating element of the apparatus, may either be submerged in the usual tank of brine which forms a part of a well understood circulatory brine system extending to the objects to be cooled and conveying the heat therefrom to the coil, or it may be located directly in the room in which the temperature is to be lowered. The relative rarefaction in the expansion coil is maintained by connecting its discharge outlet 10 with the suction 11 of the gas compressor above mentioned, whereby the expanded and gasified refrigerant is again compressed and returned through the condenser to the storage tank for further use.

The return or outlet connection from the expansion coil to the compressor is made through a gas and liquid separator, marked 12, by means of which such portion of the refrigerant as passes through the expansion coils without becoming gasified, is separated from the gasified refrigerant and collected, so that it can be removed and separately restored to its previous state of pressure, while gas only is admitted to the gas compressor for recompression and subsequent condensation.

The separator (Figs. 2 and 3) consists of a casing 14 with its upper chamber divided by baffle walls 13 into two tortuous passages. The expanded refrigerant, comprising gas and liquid, enters the separator from the outlet 10, divides, and passes through the said passages becoming reunited again in the central chamber 15, where the gas is drawn upwardly into the suction pipe 11 which is connected to the top of the casing. The liquid in the expanded refrigerant impinges on the walls of the curved passages, largely by the centrifugal effect, and flows down onto the inclined floor 16, from which it drips into the collecting basin formed by the bottom of the chamber. At the points where the passages make sharp turns, the walls are preferably ribbed, as shown at 17, in order to increase the impingement area. While the type of separator just described is quite satisfactory for the purposes of the case in hand and possesses certain special advantages, it will be understood that other types may be employed with equal effect, the principal consideration being that the separation shall be accomplished rapidly and effectively so that the full amount of the liquid may be removed and restored to the storage tank pressure without passing through the stages of vaporization, compression and condensation, and whereby such liquid is prevented from entering the gas compressor. The presence of liquid refrigerant in the gas compressing cylinder will not only very seriously impair the efficiency of that apparatus, for obvious reasons, but is also a source of injury, as is known to those familiar with this art. By removing the danger from this source, particular caution in adjusting the expansion valve is rendered unnecessary.

The collecting basin in the base of the separator is supplied with two outlets for the liquid therein, one for the liquid refrigerant and another for such oil or water as may have been carried over through the expansion coil with it. These outlets are disposed at different levels so as to take advantage of the different specific gravities of the oil and refrigerant and thus effect a more complete isolation and also purification of the latter. The refrigerant floats on the oil and is withdrawn through the upper of the two outlets which is formed by a tube 18, covered by a strainer 19 and supported in a connection head or fitting 20 through which the liquid refrigerant passes into the pipe 21. The fitting 20 is carried by the end of a tube 27 which forms an annular chamber about the outlet pipe 18 for the reception of the oil and from which the said oil may be withdrawn through a lateral outlet pipe 28, its withdrawal being accomplished either by means of gravity or by a pump as shown at 29, according as the system is operated under pressure above atmosphere or under vacuum. The lateral pipe 28 affords a convenient bottom connection for the sight-tube 30 with which the separator is supplied, the upper end of the said tube being connected with the separator above the normal level of the liquid therein. When the system is in operation, the sight-tube affords a visual indication to the operator of the amount of liquid issuing from the expansion coil, and thereby greatly facilitates the operation and control of the system, as later explained.

The liquid refrigerant collected by the separator may be continuously or intermittently restored to former pressure, according to convenience, but in any case the arrangement of the removing and pressure-restoring parts is such that any gas that forms therein may ascend freely through the liquid by virtue of its lesser specific gravity, and pass into the separator and gas suction 11. In the system shown by Fig. 1 the liquid outlet-pipe 21 is connected through the valve 21ª with the inlet pipe of a pump 22 which operates more or less continuously to remove the liquid about at the same rate as it enters the separator. This pump is preferably of the type wherein the introduction of the liquid to the pumping chamber is effected by gravity, without relief of pressure, so that gasification thereof within the pump or its connection is prevented so far as possible. To this end the pump is located somewhat below the level of the separator and the inlet pipe 21 is in open communication with an inlet reservoir 22 which surrounds the pumping cylinder. The liquid in this reservoir 22 flows through a lateral opening 23 into the pump cylinder above the head of the plunger 24 therein, and during the upstroke of the latter flows by gravity through the valve controlled ports 24ª in the said plunger to the opposite or lower side thereof. A suitable valve for controlling ports 24ª may consist, as illustrated in Fig. 5, of an ordinary puppet valve 24ᵇ with its stem held for limited movement in the plunger head and surrounded by a light coil spring 24ᶜ which tends to seat it and close the ports 24ª. During the upstroke of the plunger the valve is unseated allowing the liquid to pass into the pumping chamber and at the same time permits gas which may be present beneath the plunger to pass out through the inlet reservoir and from thence into the separator and suction 11, all of the said parts being arranged as shown, so that the gas forming therein and acting under its tendency to rise in the liquid, will find a substantially direct and unobstructed upward passage therethrough to the gas above the liquid in the separator. On the downstroke the valve is positively closed by contact with the liquid, and the latter is forced out through the force-valve 25 into the pipe 26, whence it passes with its former pressure restored, to the storage tank 5. The presence of the cool liquid refrigerant in the inlet reservoir 22 surrounding the pumping chamber cools and insulates the latter and tends to prevent gasification of the liquid therein by such relative relief of pressure as may be due to the slight inertia or friction of the inlet valve 24ª.

In the modified form of the system illustrated by Fig. 4, the liquid collected by the separator is intermittently restored to its initial or storage-tank pressure, by the agency of energy taken from the gas compressor, and the necessity of a special liquid pump is avoided. In this figure the apparatus is the same, with exception of the pump and its connections, as the apparatus of Fig. 1 and bears the same reference numerals. The bottom of the separator is connected through a valved connection 21ª with a closed reservoir 31 into which the liquid refrigerant from the separator can pass by gravity. The reservoir is supplied with a sight-tube for indicating the level therein, and has a bottom outlet through a check-valve 32 into the pipe 26 which leads as before to the storage tank 5. When the reservoir is filled or nearly filled with separated liquid, as indicated by the sight-tube, the valve 21ª is momentarily closed while compressed gas is admitted to the top of the reservoir by way of valve 34 and pipe 33, which connects the reservoir with the force pipe 2 of the gas compressor. The force pipe pressure is sufficient to expel the liquid from the reservoir 31 into the tank 5, whereupon the gas valve 34 is closed and the valve 21ª is opened to reëstablish communication with the separator. The sight-tube on the reservoir serves the same indicating functions as that on the separator and may be used to the exclusion of the latter, if desired. On the reëstablishment of the communication between the reservoir and the separator, the excess of pressure in the former will be neutralized and further separated liquid may enter and collect within the reservoir, in obvious manner. Still other methods of restoring the pressure to the separated liquid may be resorted to within the scope of the invention.

The separation of the gas and liquid of the discharge from the expansion coil, as accomplished by the apparatus above described, enables a sufficient quantity of liquid to be passed through the coils to maintain the full length of its interior in a constantly wetted condition, without impairing the rarefaction therein on the one hand, or endangering the compressor on the other, so that the conversion of liquid into gas and the absorption of heat, attendant thereon, may thus safely take place over the greatest amount of internal coil area, thereby utilizing the full capacity of the apparatus. The separation of the gas and liquid, however, will not suffice to accomplish these results to a degree insuring the full possibilities of the system unless the rate of delivery of liquid from the discharge of the expansion coil can be directly ascertained and correspondingly controlled, for the maintenance of the wetted condition of the interior of the coil should not be accomplished by more of the liquid refrigerant than is just sufficient for the purpose. The indication afforded by the level of the liquid in the sight-tube of the separator enables the operator to ascertain with certainty the conditions obtaining within the coil and to set or vary the expansion valve accordingly for the best results or changing conditions, while gas of uniform density is thus delivered to the compressor, providing for that apparatus a practically constant load under which its operation is manifestly most efficient.

I claim the following:

1. In a refrigerating system of the kind described, the combination with the gas compressor, liquid storage tank and expansion coil, of a gas and liquid separator connecting the discharge of the coil with the suction of the compressor, and a pump below the separator for returning liquid refrigerant therein to the tank, provided with means allowing flow of gas from beneath the pumping plunger to the separator.

2. In a refrigerating system of the kind described, the combination with the gas compressor and expansion coil, of a gas and liquid separator connecting the discharge of the coil with the suction of the compressor, a pump having its cylinder in normally open communication with the liquid in said separator and below the same and a pumping plunger in said cylinder provided with means for venting the gas formed therein into said separator.

3. In a refrigerating system of the kind described, the combination with a gas and liquid separator and a pump for removing the collected liquid therein having its inlet pipe and pumping cylinder below said separator and arranged to provide for gravitational separation and return to the said separator of the gas forming in said pump.

4. In a refrigerating system of the kind described, the combination with a gas and liquid separator and a pump having a pumping cylinder, an inlet reservoir surrounding said cylinder and an inlet pipe connecting said reservoir to the liquid in the separator, the said cylinder, reservoir and pipe being arranged to provide for the gravitational return to the separator of the gas forming in the pump.

5. In a refrigerating system of the kind described, the combination with a gas and liquid separator and a pump having its cylinder and inlet pipe arranged to provide for gravitational passage of gas to the separator, and having its inlet valve arranged in the plunger thereof and providing for the escape of gas from beneath the plunger into said inlet pipe.

6. In a refrigerating system of the kind described, a storage tank for liquid, an expansion valve, an expansion coil supplied thereby from the tank and a gas and liquid separator connecting the discharge of the coil with the suction of a gas-compressor and provided with an outlet pipe for the liquid collected therein, in combination with a transparent sight-tube having communication by its lower end with said pipe, its other end being in communication with the gas in the separator above the liquid, and a means connected with said pipe for returning the collected liquid to said storage tank.

7. In a refrigerating system of the kind described, an expansion coil, a gas and liquid separator connecting the discharge of the coil with the suction of a gas-compressor and provided with outlets at different levels for liquids collected therein, in combination with a pump connected with the outlet of lower level and located below said level.

8. In a refrigerating system of the kind described, an expansion coil and a gas and liquid separator connecting the discharge thereof with the suction of a gas-compressor, in combination with outlet pipes connected with said separator at different levels for liquids collecting therein and a pump connected with each of said outlet pipes.

In testimony whereof, I have signed my name to the specification in the presence of two subscribing witnesses.

ERNST DETTMAR.

Witnesses:
H. G. KIMBALL,
CLIFFORD H. KLOS.